United States Patent [19]
Aasman

[11] Patent Number: 5,776,531
[45] Date of Patent: Jul. 7, 1998

[54] METHODS AND APPARATUS FOR PEELING POTATOES AND SIMILAR PRODUCE

[76] Inventor: Jan Rense Aasman, De Sallandse Roe 37, NL-8252 JW Dronten, Netherlands

[21] Appl. No.: 745,297

[22] Filed: Nov. 8, 1996

Related U.S. Application Data

[63] Continuation of PCT/NL95/00164 May 8, 1995

[30] Foreign Application Priority Data

May 9, 1995 [NL] Netherlands .................. 9400765

[51] Int. Cl.[6] .................. A23N 7/00; A23N 7/02; A23L 1/00; A23L 1/216
[52] U.S. Cl. .................. 426/482; 99/542; 99/546; 99/584; 99/588; 426/483
[58] Field of Search .................. 99/538–541, 542–545, 99/547, 562–566, 584, 588–591, 631, 634, 623; 426/481–484

[56] References Cited

U.S. PATENT DOCUMENTS

| | | | |
|---|---|---|---|
| 3,586,081 | 6/1971 | Loveland et al. | 99/546 X |
| 3,610,303 | 10/1971 | Loveland et al. | 99/542 |
| 3,760,665 | 9/1973 | Vadas | 426/482 |
| 3,848,524 | 11/1974 | Semrow | 99/631 |
| 4,135,002 | 1/1979 | Hodges et al. | 426/482 |
| 4,164,964 | 8/1979 | Daniels | 99/302 R |
| 4,220,964 | 9/1980 | Mohri et al. | 426/482 |
| 4,309,943 | 1/1982 | Larsen et al. | 99/509 |
| 4,377,601 | 3/1983 | Dreese et al. | 426/482 |
| 4,490,912 | 1/1985 | Hirano | 99/543 |
| 4,865,860 | 9/1989 | Curtis et al. | 426/482 |
| 5,097,735 | 3/1992 | Mendenhall | 99/538 X |
| 5,211,098 | 5/1993 | Mendenhall | 99/538 |

FOREIGN PATENT DOCUMENTS

| | | |
|---|---|---|
| 0 088 000 | 9/1983 | European Pat. Off. . |
| 0 453 388 | 10/1991 | European Pat. Off. . |
| 446651 | 6/1927 | Germany . |
| 353 290 | 8/1931 | United Kingdom . |

*Primary Examiner*—Timothy F. Simone
*Attorney, Agent, or Firm*—David P. Gordon; Thomas A. Gallagher; David S. Jacobson

[57] ABSTRACT

A method for dry peeling potatoes includes punching the periphery of a potato to form a partially peeled potato having a standardized dimension, moving the partially peeled potato under and over other cutting members to remove the remainder of the potato skin. According to a presently preferred method, the potato is punched with an oval-cylindrical punch and the punch is utilized to hold the potato as a workpiece for further cutting operations. An apparatus according to the invention includes a plurality of punches which are arranged in carriers for transport through an assembly line; a plurality of plungers arranged along the assembly line for pushing a potato into a punch, for removing scraps, for repositioning the potato in the punch for further cutting operations, for removing the peeled potato from the punch, and optionally for cutting the peeled potato into a plurality of pieces; a plurality of movable cutting knives arranged along the assembly line for removing skin from opposite sides of the potato as it is held in the punch; and a conveying means for moving the carriers to the plungers and knives along the assembly line. Circular and linear assembly lines are disclosed. The invention produces approximately half the waste as compared to known methods and apparatus. Moreover, the waste is dry and usable for cattle feed, for example, and need not be processed as a pollutant.

20 Claims, 11 Drawing Sheets

METHODS AND APPARATUS FOR PEELING POTATOES AND SIMILAR PRODUCE

This application is a continuation-in-part of PCT Application PCT/NL95/00164 date the May 8, 1995.

BACKGROUND OF THE INVENTION

1. Field of the Invention

The invention relates to apparatus for peeling potatoes and methods for using the apparatus. More particularly, the invention relates to methods apparatus for the dry peeling of potatoes in a mass production environment.

2. State of the Art

There are several known machines which are used in the industrial processing of potatoes. These machines utilize various rolling, scraping, peeling and cutting devices to remove the outer skins and blemished parts from potatoes. Exemplary known machines for processing potatoes and similar produce are disclosed in German patent documents DE-C-446 651, European patent documents EP-A-0 088 000 and EP-A-0 453 388, and British patent document GB-A-353 290. The German patent document discloses a machine for peeling potatoes which utilizes a series of knives directed at different portions of the potato. European patent document EP-A-0 088 000 discloses a machine which uses a rotating drum to remove most of the potato skin by abrasion and knives for removing the end portions of the potato and skin. European patent document EP-A-0 453 388 discloses a machine which uses a series of rotating knives to peel fruit. The British document discloses a machine in which a tuber is rotated between fixed knives.

All of the known potato peeling machines are relatively inefficient, sacrificing up to 60% of the potato during processing. In addition, many of the machines require the use of large quantities of water in order to remove the outer skins from potatoes. An effluent by-product of the known machines is a slurry of ground potato cuttings and water which is considered to be a pollutant. The slurry must be processed and the resultant sludge is useless waste material.

SUMMARY OF THE INVENTION

It is therefore an object of the invention to provide apparatus and methods for peeling potatoes which are more efficient than the known apparatus and methods.

It is also an object of the invention to provide apparatus and methods for peeling potatoes which do not require the use of water.

It is another object of the invention to provide apparatus and methods for peeling potatoes which do not produce pollutant by-products.

It is still another object of the invention to provide apparatus and methods for peeling potatoes which produce useful by-products.

In accord with these objects which will be discussed in detail below, a method of the present invention includes punching the periphery of a potato (or other similar produce) to form a partially peeled potato having a standardized dimension, and moving the partially peeled potato under and over other cutting members to remove the remainder of the potato skin. According to a presently preferred method, the potato is punched with an oval-cylindrical sleeve-like punch and the punch is utilized to hold the potato as a workpiece for further cutting operations. An apparatus according to the invention includes a plurality of punches which are arranged in carriers for transport through an assembly line; a plurality of plungers arranged along the assembly line for pushing a potato into a punch, for removing scraps, for repositioning the potato in the punch for further cutting operations, for removing the peeled potato from the punch, and optionally for cutting the peeled potato into a plurality of pieces; a plurality of movable cutting knives arranged along the assembly line for removing skin from opposite sides of the potato as it is held in the punch; and a conveying means for moving the carriers to the plungers and knives along the assembly line. Circular and linear assembly lines are disclosed. Tests indicate that the methods and apparatus of the invention produce approximately half the waste as compared to the known methods and apparatus. Moreover, the waste is dry and usable for cattle feed, for example, and need not be processed as a pollutant. Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
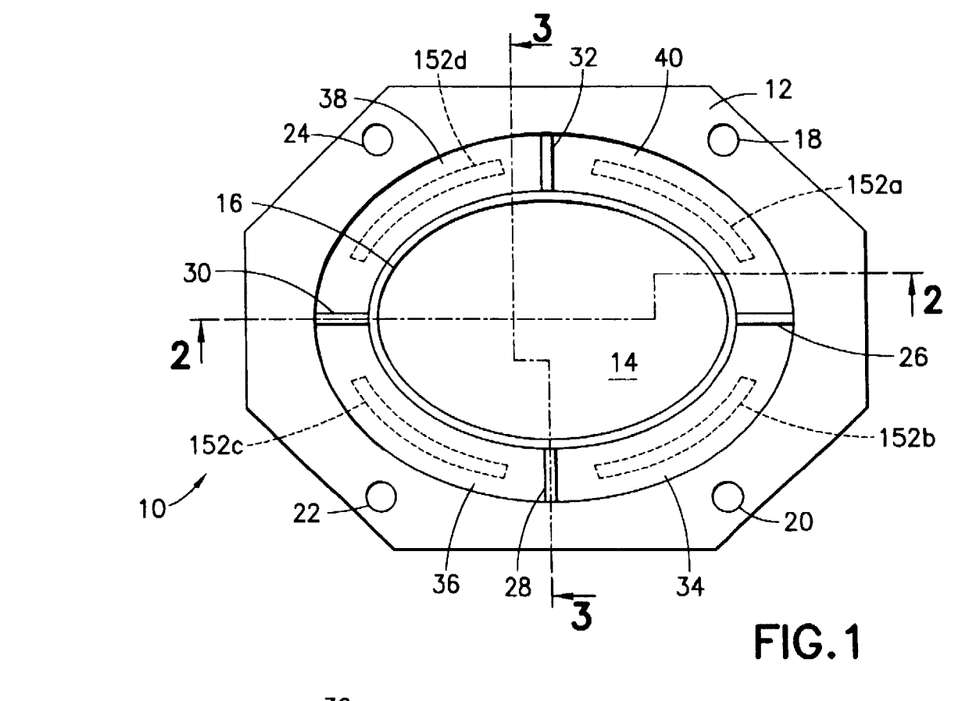
FIG. 1 is a schematic plan view of a potato punch cutter according to the invention.
Figure 2:
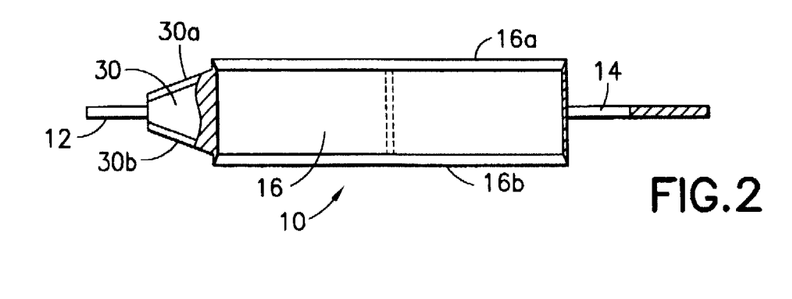
FIG. 2 is a cross section taken along line 2—2 in FIG. 1.
Figure 3:
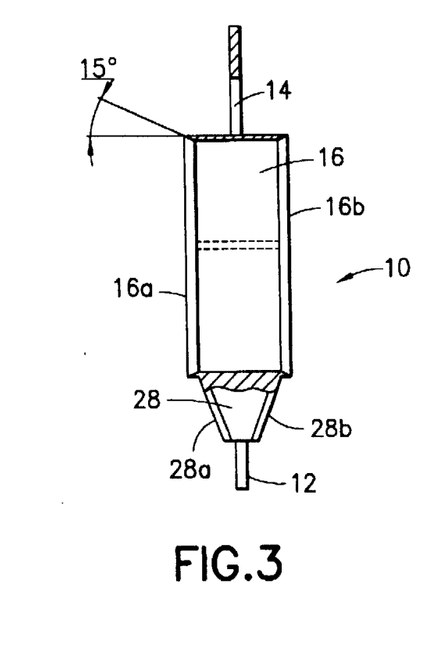
FIG. 3 is a cross section taken along line 3—3 in FIG. 1.

Referring now to FIGS. 1 through 3, a presently preferred embodiment of a potato punch assembly 10 according to the invention includes a stainless steel plate 12 having an oval central opening 14, and an oval-cylindrical punch cutter 16. The plate 12 is preferably octagonal and is provided with four peripheral openings 18, 20, 22, 24 for coupling the plate to an assembly line transport as described in detail below with reference to FIGS. 4, 12, and 13. The punch cutter 16 is attached to the plate 12 by four stainless steel tabs 26, 28, 30, 32 which thereby define four open spaces 34, 36, 38, 40 between the punch cutter 16 and the plate 12. The punch cutter 16 is preferably provided with sharp upper and lower edges 16a, 16b and the tabs 26, 28, 30, 32 are also preferably provided with sharp upper and lower edges, e.g. 28a, 28b and 30a, 30b. The dimensions of the central opening 14 in the plate 12 are preferably such that the largest potato to be processed will fit through the opening 14. The dimensions of the punch cutter are preferably such that the smallest potato to be processed will be peripherally cut by the cutting edge 16a (or 16b) of the punch cutter 16. In addition, the upper edge 16a of the punch cutter 16 is preferably bevelled inward at an angle (e.g., approx. 8°–15°) to provide a sharp edge and a decreasing inner diameter of the punch cutter 16.

According to the methods of the invention, as described in more detail below with reference to FIGS. 10 and 11, the long axis of a potato is aligned with the long axis of the punch cutter 16 and is pushed into the punch cutter. From the foregoing, those skilled in the art will appreciate that an outer portion of the potato will be separated from the portion of the potato which is pushed into the punch 16 and that the outer portion of the potato will be separated into four pieces by the tabs 26, 28, 30, 32 and will reside in the spaces 34, 36, 38, 40. It will also be appreciated that, given the angling of the punch cutter 16 between its upper and lower edges 16a, 16b, the potato will be held within the punch cutter 16 against the action of gravity. As the potato is held in the punch cutter 16, the tray 12 may be moved through an assembly line wherein other cutting devices remove upper and lower portions of the potato as described below.

Figure 4:
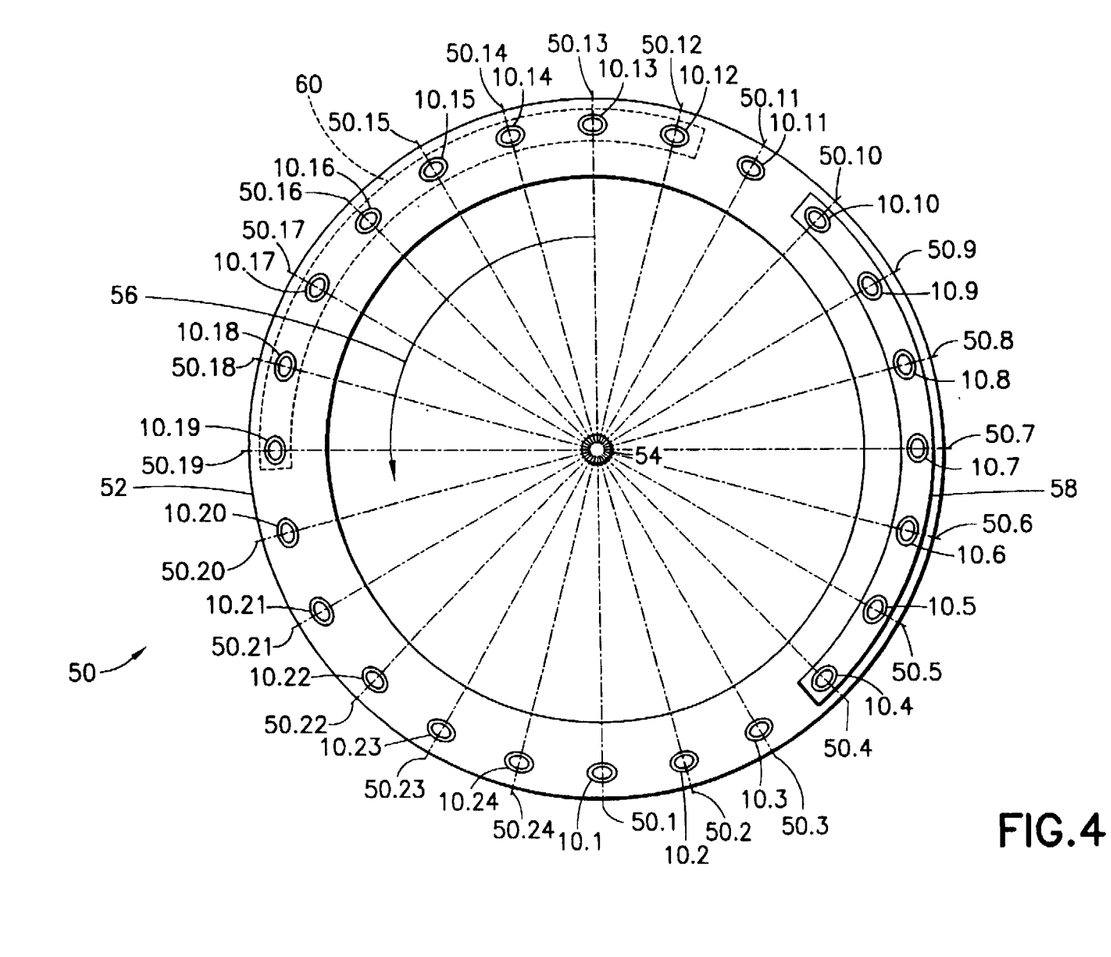
FIG. 4 is a schematic plan view of a circular assembly line utilizing a plurality of punch cutters.

Turning now to FIG. 4, a first embodiment of an assembly line transporter 50 includes a rotating circular transport tray 52 upon which twenty-four potato punch assemblies 10.1 through 10.24 are arranged as shown. Each of the potato punch assemblies is substantially identical to the assembly 10 described above with reference to FIGS. 1–3 and is attached to the tray 52 by the mounting holes 18, 20, 22, 24 described above. The tray 52 is rotated in a stepwise manner by a motor 54 in the direction indicated by the arrow 56 such that each punch assembly is sequentially delivered to twenty-four processing stations 50.1 through 50.24 as described in more detail below with reference to FIGS. 10a–10v. A different operation is performed at each station in order to remove all of the outer skin and blemishes from each potato carried in a respective punch assembly 10.1 through 10.24. As will be described in more detail below with reference to FIG. 10, some operations are performed on the upper portion of the potato and some operations are performed on the lower portion of the potato. Accordingly, an upper guide track 58 and a lower guide track 60 are provided. The upper guide track 58 holds the potato in the assembly 10 so that it extends out of the bottom of the punch cutter 16 so that operations on its lower surface can be performed. The lower guide track 60 holds the potato in the assembly 10 so that it extends out of the top of the punch cutter 16 so that operations on its upper surface can be performed. Thus, as shown in FIG. 4, operations on the lower surface of the potato are performed at stations 50.5 through 50.10 and operations on the upper surface of the potato are performed at stations 50.12 through 50.19.

Additional cutting and shaving devices for removing the upper and lower skin of the potato are shown in FIGS. 5 through 9.

Figures 5, 6, 7:
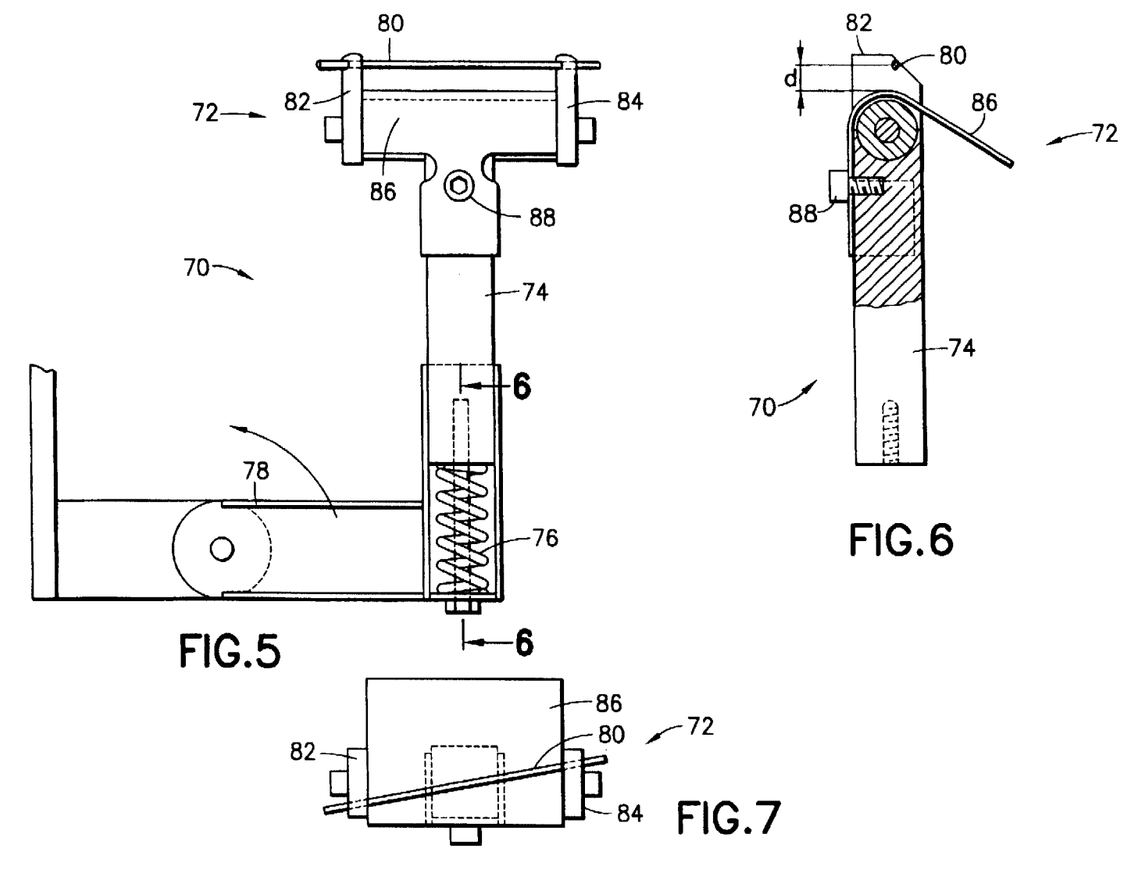
FIG. 5 is a schematic side elevation view of a shaving cutter according to the invention.
FIG. 6 is a cross section taken along line 6—6 in FIG. 5.
FIG. 7 is a partial top view of the cutter of FIG. 5.

Turning now to FIGS. 5–7, a potato "shaving" device 70 includes a cutting head 72 which is mounted on the end of an axially displaceable shaft 74 which is spring biased by a spring 76 and coupled to an articulate arm 78. The cutting head 72 includes a cutting wire (or blade) 80 which is held between two flanges 82, 84 at an angle relative to the center line of the flanges as seen best in FIG. 7. An adjustable guide plate 86 is arranged below the cutting wire 80. The position of the guide plate 86 relative to the cutting wire 80 is adjustable and set by a set screw 88 to a distance "d" shown in FIG. 6. The distance "d" determines the thickness of potato peels cut by the shaving device 70.

Figure 8:
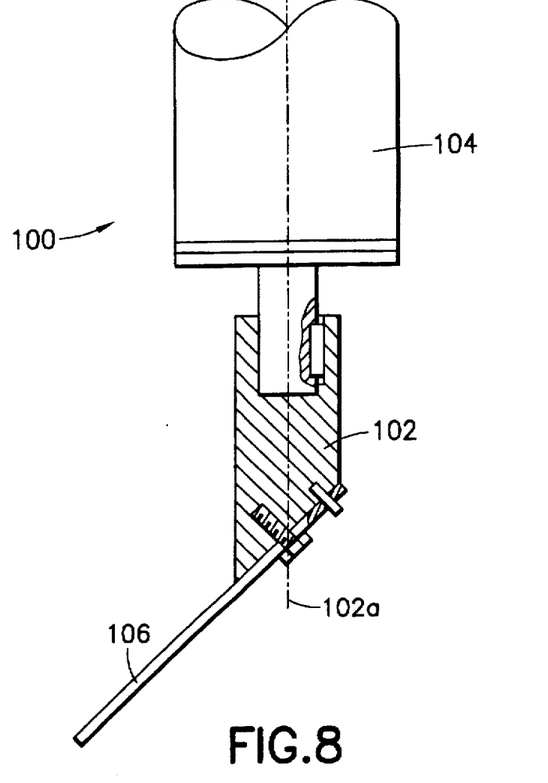
FIG. 8 is a broken schematic side elevation view in partial section of a rotating cutter according to the invention.
Figure 9:
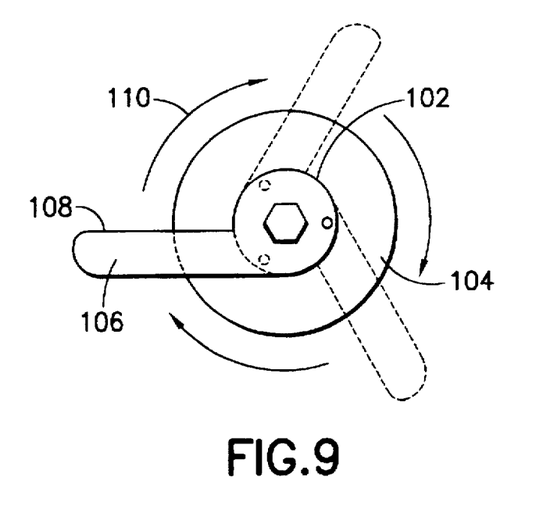
FIG. 9 is a schematic top view of the cutter of FIG. 8.

Referring now to FIGS. 8 and 9, a rotating paring knife device 100 includes a blade holder 104 which is coupled to the shaft of a motor 104 and which holds a paring knife 106 at an angle relative to the axis of rotation 102a of the holder 102. The knife 106 has a sharp cutting edge 108 and is rotated by the motor 104 in a direction as shown by arrow 110 in FIG. 9.

Figure 10A:
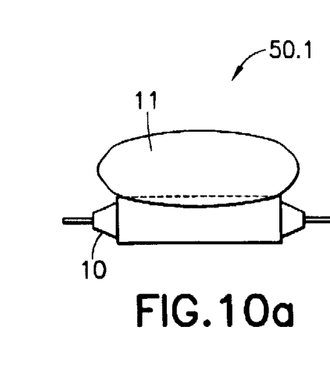
FIGS. 10a through 10v are schematic representations of a sequence of operations utilizing the apparatus and methods of the invention.
Figure 10B:
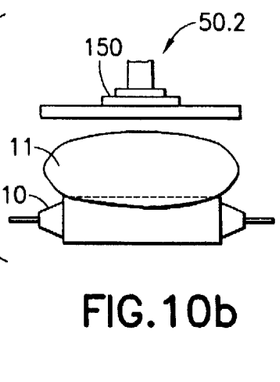
Figure 10C:
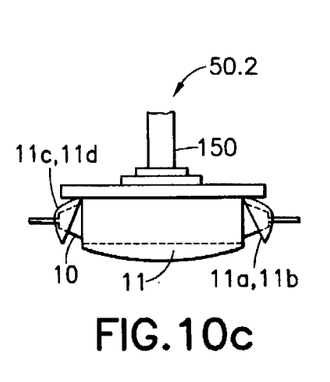
Figure 10D:
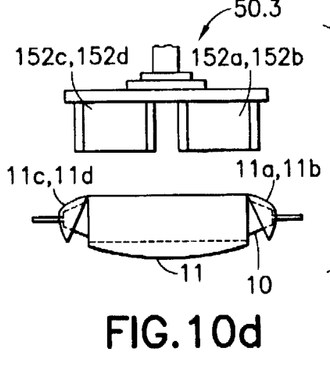
Figure 10E:
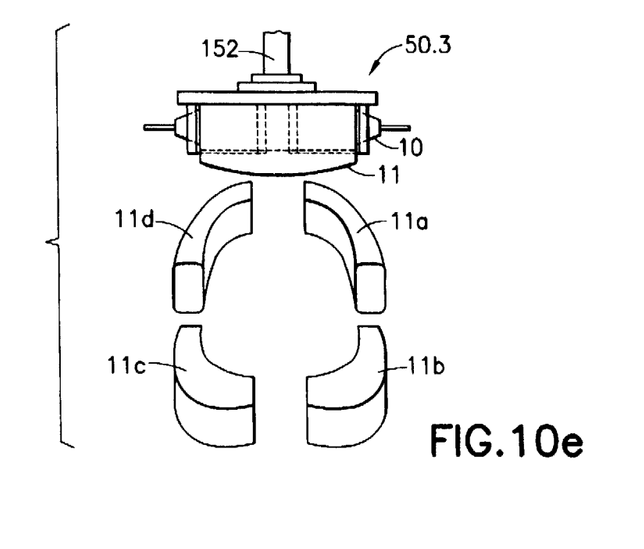
Figure 10F:
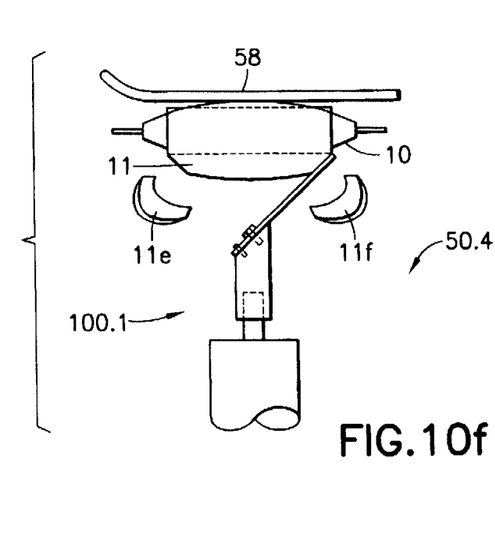

According to a presently preferred embodiment of the invention, six shaving devices 70 and two rotating paring knives 100 are used in conjunction with a plurality of punch assemblies 10 on an assembly line for peeling potatoes. FIGS. 10a through 10v schematically illustrate a presently preferred sequence of operations which remove the outer surface of a potato in fourteen pieces. FIG. 11 shows the fourteen pieces which are removed from a potato to form a peeled potato according to the invention.

Figure 10G:
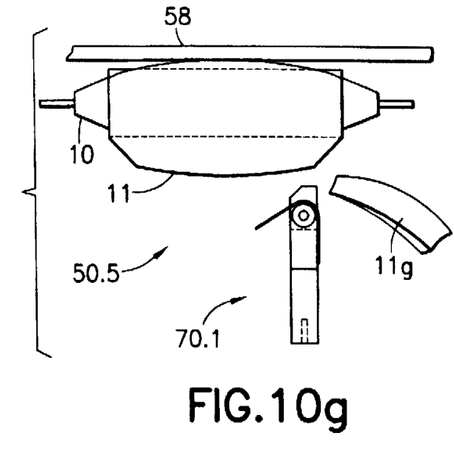
Figure 10H:
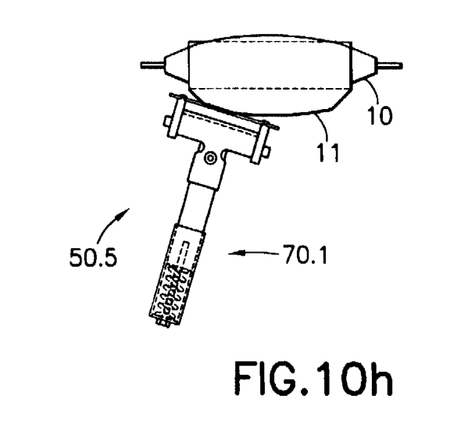
Figure 10I:
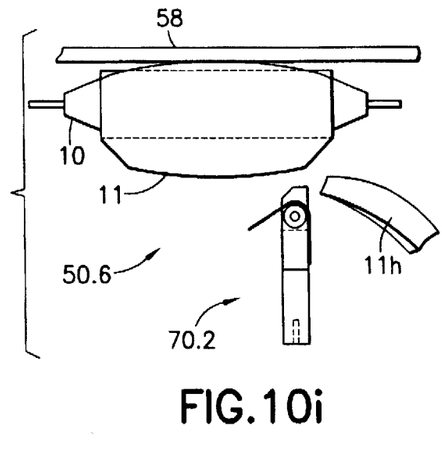
Figure 10J:
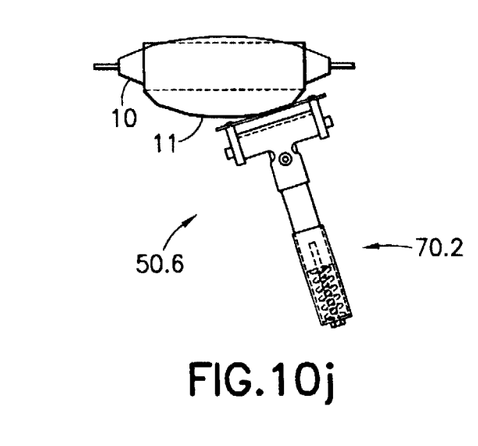
Figure 10K:
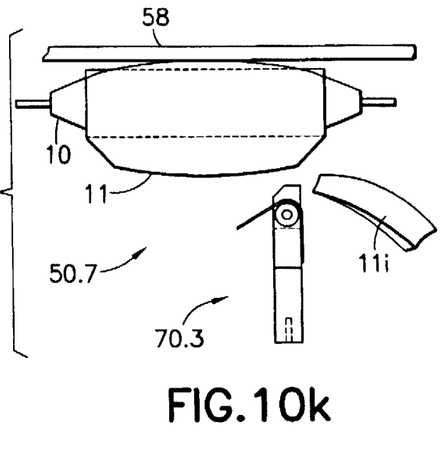
Figure 10L:
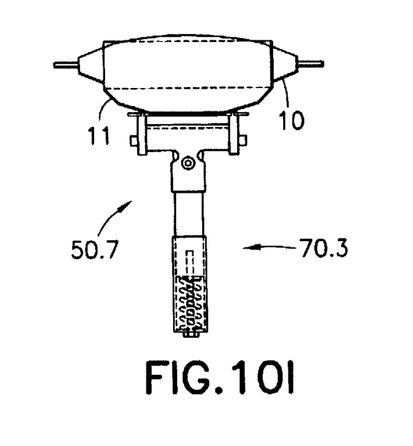
Figure 10M:
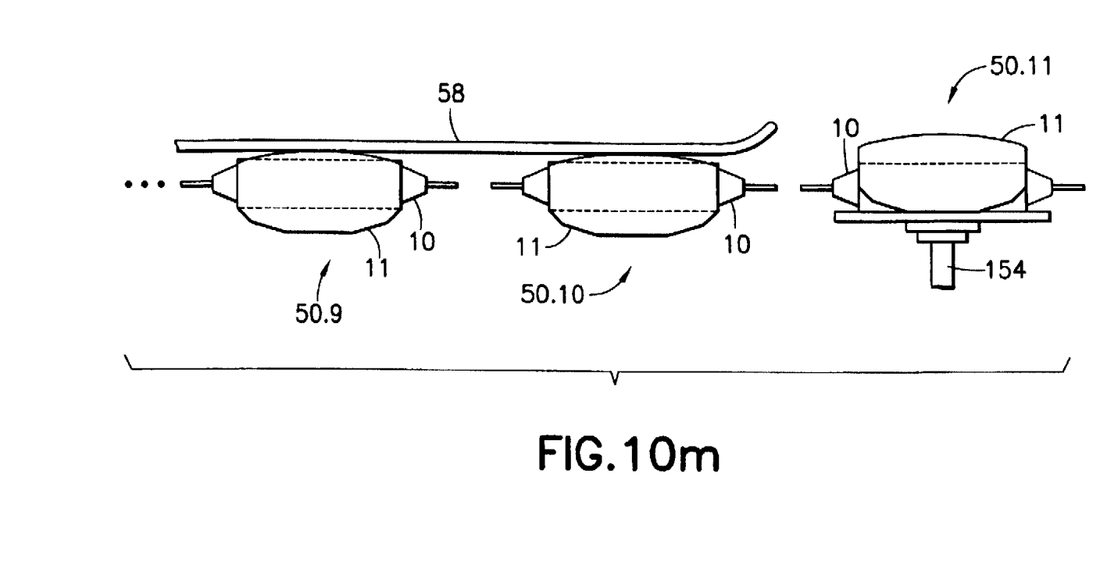
Figure 10N:
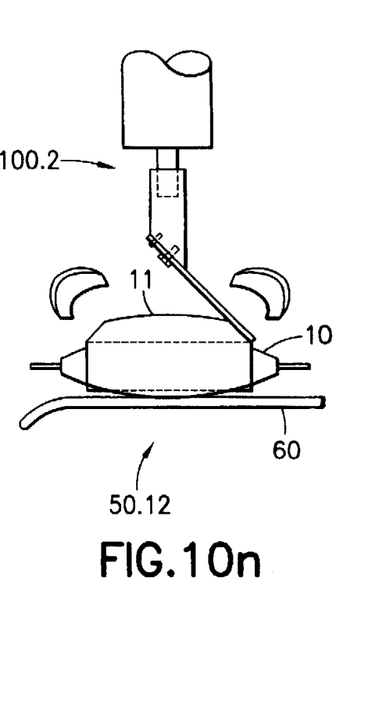
Figure 10O:
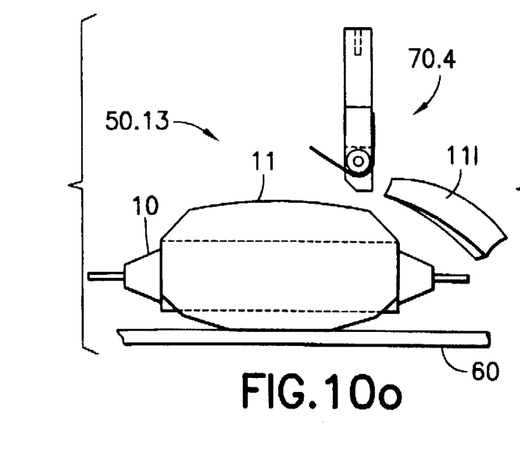
Figure 10P:
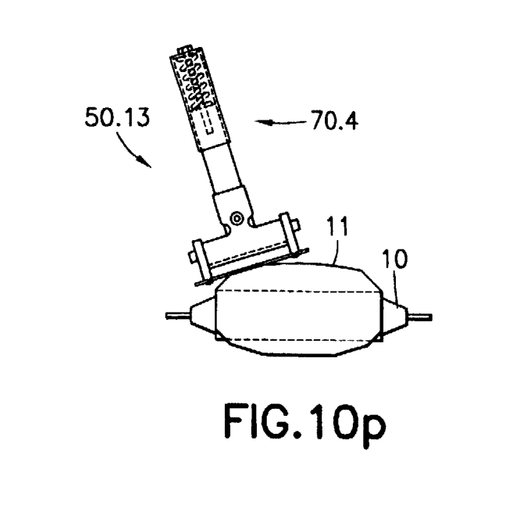
Figure 10Q:
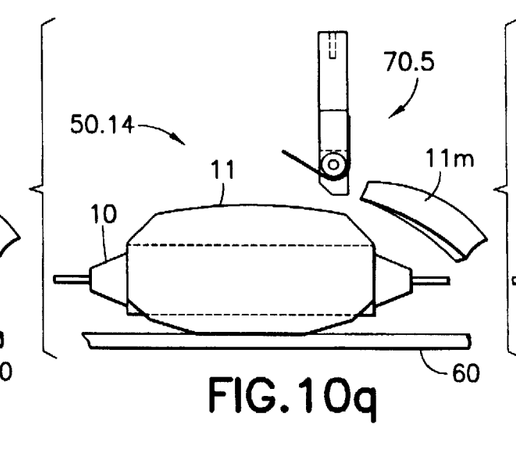
Figure 10R:
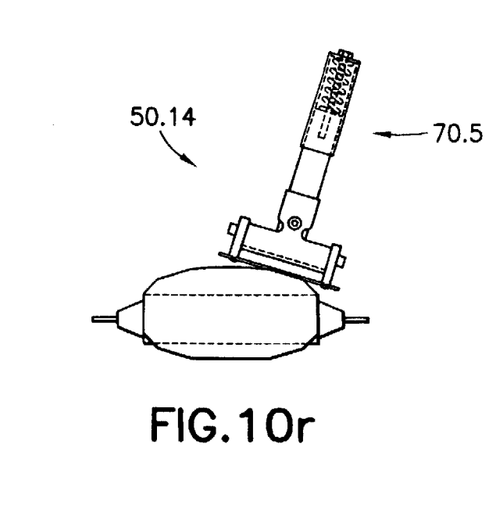
Figure 10S:
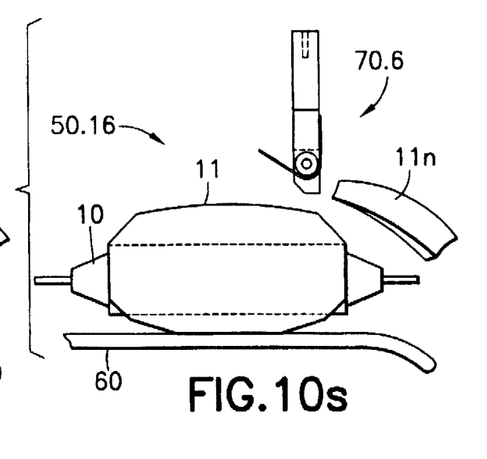
Figure 10T:
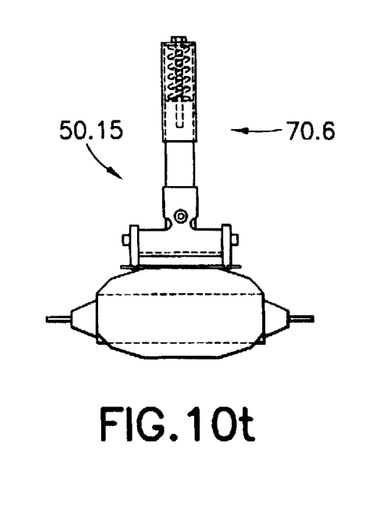
Figure 10U:
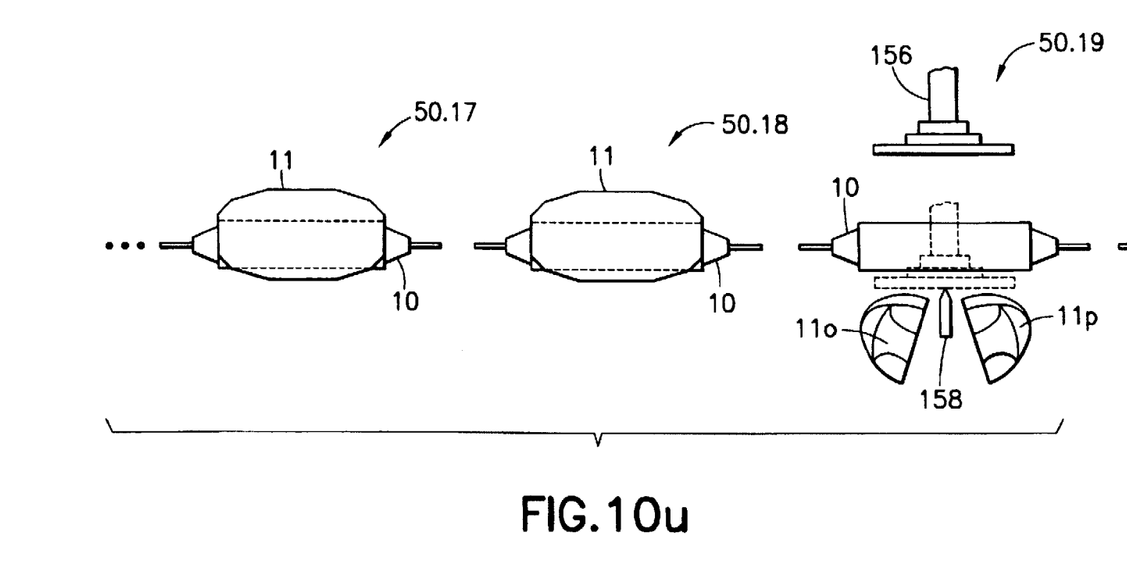
Figure 10V:
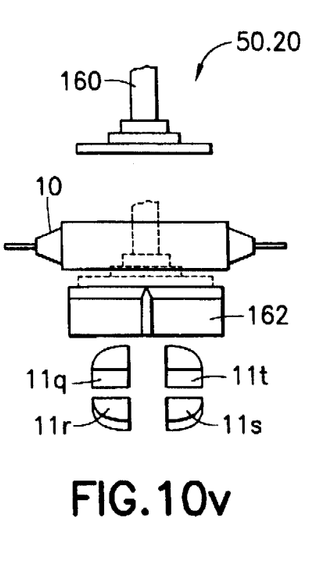
Figure 11:
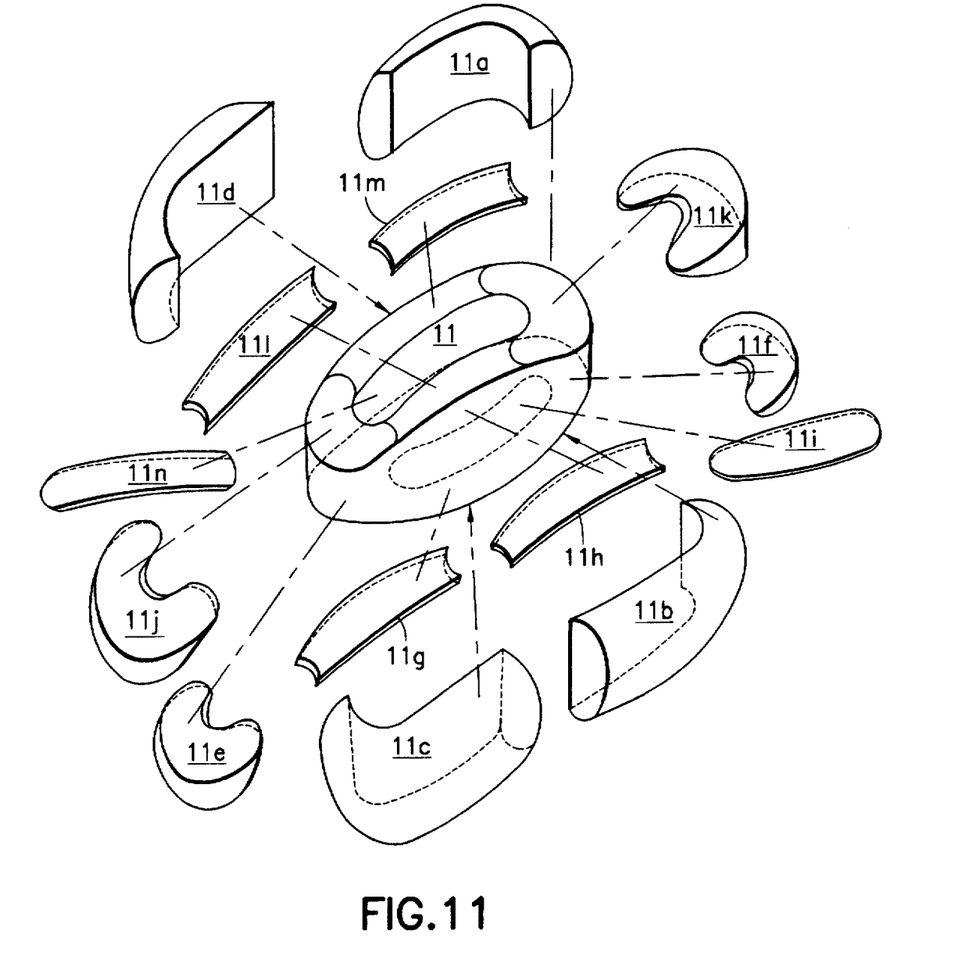
FIG. 11 is an exploded schematic view of a potato peeled according to the invention and the pieces of the potato which are removed according to the invention.

Turning now to FIGS. 10a through 10v, and with reference to FIGS. 1, 4, and 11, a first operation on a potato 11 is performed at station 50.1 shown in FIGS. 4 and 10a. At this station, the potato 11 is placed on top of a punch assembly 10. As suggested in FIGS. 4 and 10a through 10v, a plurality of punch assemblies 10.1 through 10.24 are linked together and are movable to the various stations 50.1 through 50.24 in the assembly line. After the potato is deposited on the punch assembly, the assembly 10 is moved to the next station 50.2 wherein a first plunger 150 is aligned above the potato 11 as shown in FIG. 10b. The plunger 150 is lowered onto the potato 11 as shown in FIG. 10c and the potato is pushed into the punch assembly 10. It will be appreciated that the punch cutter 16 and the tabs 26, 28, 30, 32 (FIG. 1) separate four outer pieces 11a–11d from the potato 11. These pieces are seen best in FIG. 11. It will also be appreciated that the potato 11 and the four pieces 11a–11d will continue to reside in the punch assembly 10 unless and until they are pushed out of the assembly. Accordingly, in order to dispose of the four pieces 11a–11d, the assembly 10 is moved to station 50.3 wherein a four segment plunger 152 is aligned above the punch assembly 10 as shown in FIG. 10d. The plunger 152 is provided with four spaced apart peripheral segments 152a–152d which may be seen best schematically in FIG. 1 as they relate to the position of the punch assembly 10. The plunger 152 is lowered into the punch assembly 10 as shown in FIG. 10e and the four pieces 11a–11d of the potato 11 are pushed out of the assembly 10. Those skilled in the art will appreciate that station 50.3 preferably includes a collection bin and/or conveyor to capture the pieces 11a–11d as they fall from the punch assembly 10. After the above described operations have been performed, the remaining processing of the potato 11 is relatively simple because the potato 11 remains held in place by the punch assembly 10 and the surfaces of the potato which remain to be peeled are relatively accessible as described in more detail below. The above described procedure is considered to be the broad essence of the invention, i.e., pushing the potato into a punch to remove an outer peripheral portion of the potato and to hold the potato for further processing.

As seen in FIG. 10e, the potato 11 is now in a position relative to the assembly 10 where its lower surface is exposed for further processing. In order to assure that the potato remains in this position during processing of the lower surface, the next several stations include an upper guide track 58. According to a presently preferred embodiment, the next operation performed on the potato 11 is the removal of two lower end pieces 11e and 11f which are seen best in FIG. 11. These pieces are removed by a first rotating paring knife 100.1 at station 50.4 as shown in FIG.

10f. The knife 100.1 is substantially the same as or identical to the knife 100 described herein above. It will be understood that the station 50.4 preferably includes a collection bin and or conveyor to capture the pieces 11e, 11f.

The lower portion of the potato 11 is then subjected to three shaving operations which are illustrated in FIGS. 10g through 10l where FIG. 10h is an orthogonal view of the station illustrated in FIG. 10g, FIG. 10j is an orthogonal view of the station illustrated in FIG. 10i, and FIG. 10l is an orthogonal view of the station illustrated in FIG. 10k. During these three shaving operations, three shaving devices 70.1 through 70.3 are utilized, each one being oriented at a different angle relative to the potato 11 and as seen best in FIGS. 10h, 10j, and 10l. The shaving devices are substantially the same as or identical to the shaving device 70 described herein above. The first shaving device 70.1 removes a first side lower portion 11g from the potato 11. The second shaving device 70.2 removes a second side lower portion 11h from the potato 11. The third shaving device 70.3 removes a central lower portion 11i from the potato 11. The pieces 11g–11i are shown best in FIG. 11.

It will be appreciated that after the potato has been processed at station 50.7, the only portion remaining to be processed is the upper portion. If desired, additional scrubbing or sanding of the lower portion of the potato may be performed at stations 50.8, 50.9, and 50.10. When the potato reaches station 50.11, as shown in FIG. 10m, the upper guide track 58 is discontinued and a lower plunger 154 is arranged below the assembly 10 and is raised to push the potato 11 up in the punch assembly so that its upper surface is exposed for processing. A lower guide track 60 is provided for the next series of operations which begin at station 50.12 as shown in FIG. 10n. The operation at station 50.12 is performed with a second rotating paring knife 100.2 and is substantially the same as the operation performed at station 50.4 described above, except on the upper surface of the potato. The two pieces 11j and 11k removed from the potato are preferably collected by a vacuum or bin or conveyor (not shown). The upper surface of the potato 11 is then subjected to three shaving operations at stations 50.13 through 15.15 as shown in FIGS. 10o through 10t utilizing three shaving devices 70.4 through 70.6 to remove the three remaining pieces 11l through 11n from the potato. The operations performed at stations 50.13 through 50.15 are substantially the same as the operations performed at stations 50.5 through 50.7 described above, except on the upper surface of the potato. If desired, additional scrubbing or sanding of the lower portion of the potato may be performed at stations 50.16, 50.17, and 50.18. When the potato reaches station 50.19, as shown in FIG. 10u, the lower guide track 60 is discontinued and an upper plunger 156 is arranged above the assembly 10 and is lowered to push the peeled potato 11 through the punch assembly 10. Optionally, a knife 158 may be positioned below the punch assembly to divide the potato into two parts 11o and 11p. These parts are, of course, collected for packaging and shipping together with other processed potato parts. Optionally, and as shown in FIG. 10v, station 50.20 is provided with a plunger 160 which is substantially the same as plunger 156 and a crossed knife 162 is placed below the punch assembly 10. At station 50.20, the processed potato is cut into four pieces 11q through 11t. Both stations 50.19 and 50.20 may be included on the same assembly line and the line may be programmed to deliver either halved or quartered potatoes.

Figure 12:
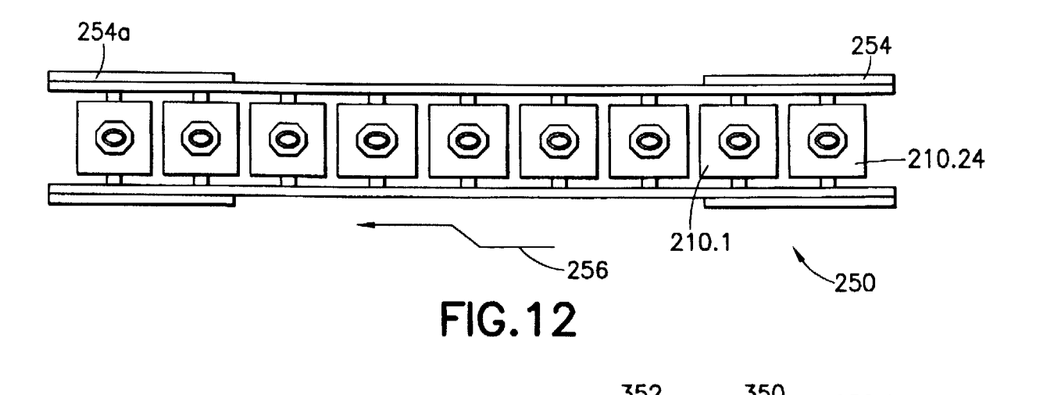
FIG. 12 is a schematic plan view of a linear chain driven assembly line utilizing a plurality of punch cutters according to the invention.
Figure 13:
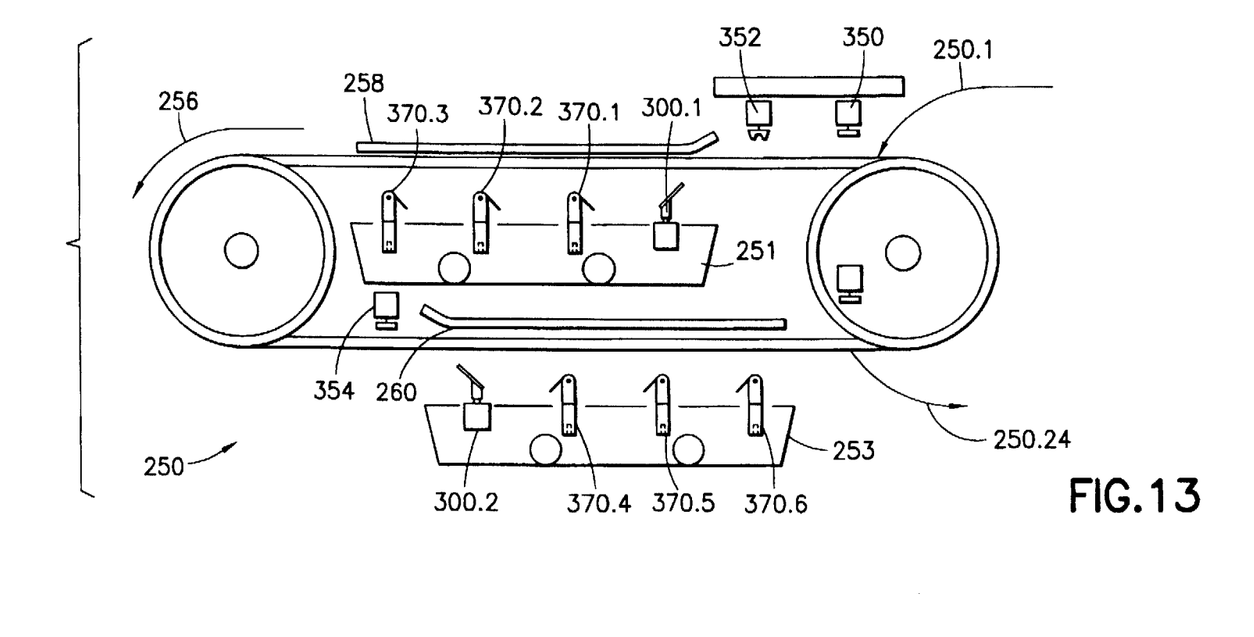
FIG. 13 is a schematic side view of the assembly line of FIG. 12.

As mentioned above, the punch assemblies 10 and the various methods described above may be used in different kinds of assembly lines. While the assembly line shown in FIG. 4 is circular, a linear type assembly line may be used or other types of assembly lines may be used. FIGS. 12 and 13 show an alternate type of assembly line 250 which is linear and circulating. The assembly line 250 is similar to the assembly line 50 described above with similar reference numerals (incremented by 200) referring to similar parts. Thus, the assembly line 250 has chain drivers 254, 254a which move a plurality of punch holders 210.1 through 210.24, a plurality of work stations 250.1 through 250.24, etc. The operations performed on the assembly line 250 are substantially the same as described above with reference to the assembly line 50. In addition, this embodiment shows collection bins 251, 253 for collecting the parts removed from the potato during processing. The removed parts may be conveyed from the bins via suction equipment (not shown) and the removed parts may then be processed for use as cattle feed, for example.

There have been described and illustrated herein several embodiments of methods and apparatus for the dry peeling of potatoes. While particular embodiments of the invention have been described, it is not intended that the invention be limited thereto, as it is intended that the invention be as broad in scope as the art will allow and that the specification be read likewise. Thus, while particular shapes have been disclosed with reference to the punch cutter, it will be appreciated that other shapes could be utilized. For example, a circular cylindrical cutter or a rectangular cutter could be used depending on the types of produce being processed. Thus, any substantially "endless" or "sleeve like" punch cutter could be used depending on the shape of the produce being processed. Also, while particular tools have been shown for cutting the potato after it is placed in the punch cutter, it will be recognized that other types of cutting and/or peeling tools could be used with similar results obtained. In addition, while the cutting edges of the various cutting members have been shown as substantially smooth, serrated cutting edges could be employed. Moreover, while particular configurations have been disclosed in reference to the number of stations on an assembly line, it will be appreciated that other configurations could be used as well. It will therefore be appreciated by those skilled in the art that yet other modifications could be made to the provided invention without deviating from its spirit and scope as so claimed.

I claim:

1. A method for peeling produce such as a potato, comprising:

a) pushing the produce into a punch cutter so that an outer periphery of the produce is substantially separated from the produce and the produce is held in the punch cutter against the action of gravity; and b) removing additional outer periphery portions of the produce while the produce is held in the punch cutter, wherein the punch cutter includes a plate member lying in a first plane and having a central opening occupying a first area, and a substantially endless punch member having a surface which is substantially perpendicular to the first plane and defining an interior area which is smaller than the first area, the punch member being located within the central opening to define an annular space.

2. A method according to claim 1, further comprising:

c) pushing the produce partially out of the punch cutter prior to removing at least some of the additional outer periphery portions.

3. A method according to claim 2, wherein:

outer periphery portions are substantially completely removed from one side of the produce prior to said step of pushing the produce partially out of the punch cutter.

4. A method according to claim 1, wherein:

outer periphery portions are removed at least in part by shaving the produce with a shaving device.

5. A method according to claim 4, wherein:

outer periphery portions are removed at least in part by paring the produce with a rotating paring device.

6. A method according to claim 1, wherein:

said step of pushing comprises pushing the produce into an oval cylindrical punch cutter.

7. A potato processed according to the method claimed in claim 1, wherein:

said potato has a cylindrical outer surface zone.

8. A potato according to claim 7, wherein:

said cylindrical outer surface zone is an oval cylindrical zone.

9. An apparatus for peeling potatoes or similar produce, comprising:

a) a first plate member lying in a first plane and having a central opening occupying a first area;

b) a substantially endless punch member having a surface which is substantially perpendicular to said first plane and defining an interior area which is smaller than said first area, said punch member being located within said central opening to define an annular space.

10. An apparatus according to claim 9, further comprising:

c) a plurality of supporting members coupled to said punch member and said first plate member, said supporting members supporting said punch member within said central opening and dividing said annular space into sections.

11. An apparatus according to claim 10, wherein:

said supporting members are plates which are substantially perpendicular to said first plane.

12. An apparatus according to claim 11, wherein:

said plates have substantially sharp edges.

13. An apparatus according to claim 9, wherein:

said punch member has a sharp edge which is bevelled inward toward said inner area.

14. An apparatus, according to claim 9, further comprising:

c) a plurality of second plate members, each having a central opening and a sleeve punch suspended within said central opening and defining an annular space surrounding said sleeve punch, said sleeve punch being dimensioned to receive an item of produce, cut a peripheral portion of the item, and hold the item against the action of-gravity;

d) a plurality of work stations for removing additional outer peripheral portions of the item of produce; and e) a conveying means coupled to said plurality of second plate members and said first plate member for moving said plate members to said work stations.

15. An apparatus according to claim 14, wherein:

said plurality of work stations includes a shaving apparatus for shaving an outer peripheral portion of the item of produce.

16. An apparatus according to claim 14, wherein:

said plurality of work stations includes a rotating paring apparatus for paring an outer peripheral portion of the item of produce.

17. An apparatus according to claim 14, wherein:

said plurality of work stations includes i) a first plunger for pushing the items of produce down into respective sleeve punches, ii) a first guide track located above said plurality of plate members, iii) a first group of cutting devices arranged sequentially below said first guide track, iv) a second plunger for pushing items of produce up and partially out of respective sleeve punches, v) a second guide track located below said plurality of plate members, vi) a second group of cutting devices arranged sequentially above said second guide track, and vii) a third plunger for pushing items of produce completely out of respective sleeve punches.

18. An apparatus according to claim 17, wherein:

said conveying means moves said plate members sequentially under said first plunger, then under said first guide track and over said first group of cutting devices, then over said second plunger, then over said second guide track and under said first group of cutting devices, and then under said third plunger.

19. An apparatus according to claim 17, wherein:

said conveying means includes a circular member with said plate members being radially arranged thereon.

20. An apparatus according to claim 17, wherein:

said conveying means includes a chain transporter with said plate members being linearly arranged thereon.

* * * * *